(12) United States Patent
Kasegawa

(10) Patent No.: US 9,360,732 B2
(45) Date of Patent: Jun. 7, 2016

(54) DISPLAY UNIT AND METHOD OF DRIVING SAME, AS WELL AS ELECTRONIC APPARATUS

(71) Applicant: Sony Corporation, Tokyo (JP)

(72) Inventor: Ryo Kasegawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/344,012

(22) PCT Filed: Sep. 28, 2012

(86) PCT No.: PCT/JP2012/075104
§ 371 (c)(1),
(2) Date: Mar. 10, 2014

(87) PCT Pub. No.: WO2013/054665
PCT Pub. Date: Apr. 18, 2013

(65) Prior Publication Data
US 2014/0233088 A1    Aug. 21, 2014

(30) Foreign Application Priority Data
Oct. 13, 2011   (JP) ................................ 2011-225566

(51) Int. Cl.
*G02B 26/00*   (2006.01)
*G02F 1/167*   (2006.01)
*G09G 3/34*    (2006.01)
(Continued)

(52) U.S. Cl.
CPC ............ *G02F 1/167* (2013.01); *G02F 1/13306* (2013.01); *G09G 3/344* (2013.01); *G09G 3/2003* (2013.01); *G09G 3/2011* (2013.01); *G09G 3/2018* (2013.01); *G09G 2300/0452* (2013.01)

(58) Field of Classification Search
CPC ..... G02F 1/167; G02F 1/13306; G09G 3/344; G09G 3/2018
USPC .................... 359/296, 900; 345/107, 204, 84; 349/106; 430/32
See application file for complete search history.

(56) References Cited

U.S. PATENT DOCUMENTS 7,324,263 B2 * 1/2008 Johnson et al. ............... 359/296
2001/0041339 A1 * 11/2001 Anderson et al. .................. 435/6
2008/0112040 A1 * 5/2008 Suwabe et al. ................ 359/296

FOREIGN PATENT DOCUMENTS

JP    50-15115    6/1975
JP    50-15120    6/1975
(Continued)

*Primary Examiner* — Tuyen Tra
(74) *Attorney, Agent, or Firm* — Chip Law Group

(57) ABSTRACT

Provided is a display unit capable of improving display performance. The display unit includes an electrophoretic particle disposed between a pair of electrodes for each pixel; and a voltage control circuit applying a voltage for each pixel, to move the electrophoretic particle. The voltage control circuit counts, for each pixel, a number of applications of a first voltage and a number of applications of a second voltage, the first voltage being applied to move the electrophoretic particle towards one of the electrodes, and the second voltage being applied to move the electrophoretic particle towards the other of the electrodes. Further, at an arbitrary timing following start of display, when the number of applications of the second voltage in part of pixels is smaller than that in other pixel, the voltage control circuit applies the second voltage to the pixel with the smaller number of applications, to bring this smaller number of applications closer to the number of applications in the other pixel.

8 Claims, 9 Drawing Sheets

(51) Int. Cl.
*G02F 1/133* (2006.01)
*G09G 3/20* (2006.01)

(56) References Cited

FOREIGN PATENT DOCUMENTS

| JP | 2002-244163 | 8/2002 |
| JP | 2005-107146 | 4/2005 |
| JP | 2005-128143 | 5/2005 |
| JP | 2007-025372 A | 2/2007 |
| JP | 2008-076848 A | 4/2008 |
| JP | 2008-197491 A | 8/2008 |
| JP | 4188091 | 9/2008 |

* cited by examiner (A)

|  | PR | PG | PB | PW |
|---|---|---|---|---|
| RAISING NUMBER | 1 | 0 | 0 | 0 |
| LOWERING NUMBER | 0 | 0 | 0 | 0 |

(B)

|  | PR | PG | PB | PW |
|---|---|---|---|---|
| RAISING NUMBER | 1 | 1 | 0 | 0 |
| LOWERING NUMBER | 1 | 0 | 0 | 0 |

(C)

|  | PR | PG | PB | PW |
|---|---|---|---|---|
| RAISING NUMBER | 1 | 1 | 1 | 0 |
| LOWERING NUMBER | 1 | 1 | 0 | 0 |

(D)

|  | PR | PG | PB | PW |
|---|---|---|---|---|
| RAISING NUMBER | 1 | 1 | 1 | 1 |
| LOWERING NUMBER | 1 | 1 | 1 | 0 |

(E)

|  | R | G | B | W |
|---|---|---|---|---|
| RAISING NUMBER | 1 | 1 | 1 | 1 |
| LOWERING NUMBER | 1 | 1 | 1 | 1 |

DISPLAY UNIT AND METHOD OF DRIVING SAME, AS WELL AS ELECTRONIC APPARATUS

TECHNICAL FIELD

The present technology relates to a display unit in which an electrophoretic particle is arranged between a pair of electrodes for each pixel, and to a method of driving the display unit, as well as an electronic apparatus using the display unit.

BACKGROUND ART

In recent years, low-power displays with high image quality have been in increasing demand, as various electronic apparatuses such as a mobile phone and a personal digital assistance (PDA) have become widespread. Above all, recently, as electronic book delivery businesses have started, displays for the purpose of reading character information for a long time have been receiving attention and therefore, a display unit having display quality suitable for that purpose has been desired.

For reading purpose, display units of a cholesteric liquid crystal type, an electrophoretic type, an electric redox type, a twisting ball type, and the like have been proposed. Above all, the reflection-type display units may be preferable. This is because bright display is performed using reflection (diffusion) of outside light in a manner similar to that of paper and therefore, display quality close to that of paper is achieved. In addition, this is also because backlight is unnecessary and therefore, power to be consumed is suppressed.

A strong candidate of the reflection-type display units is an electrophoretic display unit that effects light and shade (contrast) using an electrophoretic phenomenon. This is because power to be consumed is low, and high-speed responsiveness is superior. Therefore, various studies have been made for a display method of the electrophoretic display unit.

Specifically, there has been proposed a method in which two kinds of charged particles, which have different optical reflection properties and polarity, are dispersed in insulating liquid, and the charged particles are moved utilizing the difference in polarity (for example, see Patent Literatures 1 and 2). In this method, distributions of the two kinds of charged particles are changed in response to an electric field and therefore, contrast is effected utilizing the difference in optical reflection properties.

Further, there has been proposed a method in which charged particles are dispersed in insulating liquid, and using a porous layer having optical reflection properties different from those of the charged particles, the charged particles are moved through pores of the porous layer (for example, see Patent Literatures 3 to 6). This porous layer is a polymeric film in which pores are formed by perforation processing with a laser, a cloth woven of synthetic fibers and/or the like, an open-cell foam porous polymer, or the like. In this method, positions of the charged particles are changed in response to an electric field and therefore, contrast is effected utilizing the difference in optical reflection properties.

CITATION LIST

Patent Literature

Patent Literature 1: Japanese Examined Patent Publication No. S50-015115
Patent Literature 2: Japanese Patent No. 4188091, specification
Patent Literature 3: Japanese Unexamined Patent Application Publication No. 2005-107146
Patent Literature 4: Japanese Examined Patent Publication No. S50-015120
Patent Literature 5: Japanese Unexamined Patent Application Publication No. 2005-128143
Patent Literature 6: Japanese Unexamined Patent Application Publication No. 2002-244163

SUMMARY OF THE INVENTION

Although various display methods have been proposed for the electrophoretic display unit, it is still difficult to say that the display quality thereof is sufficient. Therefore, considering future development to colorization, moving image display, and the like, it is necessary to improve display performance by, for example, further improvements in contrast and response speed, a reduction in display unevenness, and/or the like.

Therefore, it is desirable to provide a display unit and a method of driving the same, as well as an electronic apparatus, which are capable of improving display performance.

A display unit according to an embodiment of the present technology is a display unit including: an electrophoretic particle disposed between a pair of electrodes for each pixel; and a voltage control circuit applying a voltage for each pixel, to move the electrophoretic particle. This voltage control circuit counts, for each pixel, a number of applications of a first voltage and a number of applications of a second voltage, the first voltage being applied to move the electrophoretic particle towards one of the electrodes, and the second voltage being applied to move the electrophoretic particle towards the other of the electrodes. Further, at an arbitrary timing following start of display, when the number of applications of the second voltage in part of pixels is smaller than that in other pixel, the voltage control circuit applies the second voltage to the pixel with the smaller number of applications, to bring this smaller number of applications closer to the number of applications in the other pixel. An electronic apparatus according to an embodiment of the present technology is an apparatus using the display unit according to the above-described embodiment of the present technology.

A display unit according to another embodiment of the present technology is a display unit including: a display substrate including an electrophoretic device and a color filter, the color filter having a filter region of a color different for each pixel; and a voltage control circuit applying a voltage for each pixel, to drive the electrophoretic device. This electrophoretic device includes, in an insulating liquid, a plurality of electrophoretic particles and a porous layer, the porous layer being formed of a fibrous structure, and a plurality of non-migrating particles having optical reflection properties different from those of the electrophoretic device are included in the fibrous structure. An electronic apparatus according to another embodiment of the present technology is an apparatus using the display unit according to the above-described another embodiment of the present technology.

A method of driving a display unit according to an embodiment of the present technology is a method of driving a display unit including an electrophoretic particle disposed between a pair of electrodes for each pixel, the method including: counting, for each pixel, a number of applications of a first voltage and a number of applications of a second voltage, the first voltage being applied to move the electrophoretic particle towards one of the electrodes, and the second voltage being applied to move the electrophoretic particle towards the other of the electrodes. Further, the method includes: at an arbitrary timing following start of display, when the number of applications of the second voltage in part of pixels is smaller than that in other pixel, applying the second voltage to the pixel with the smaller number of applications, to bring this smaller number of applications closer to the number of applications in the other pixel.

According to the display unit, the method of driving the same, or the electronic apparatus of the above-described embodiment of the present technology, the number of applications of the first voltage and the number of applications of the second voltage are counted for each pixel. At an arbitrary timing following start of display, when the number of applications of the second voltage in part of pixels is smaller than that in other pixel, the second voltage is applied to the pixel with the smaller number of applications, to bring this smaller number of applications closer to the number of applications in the other pixel. Therefore, display performance is allowed to be improved.

Further, according to the display unit or the electronic apparatus of the above-described another embodiment of the present technology, there are provided: the display substrate including the electrophoretic device and the color filter, the color filter having a filter region of a color different for each pixel; and the voltage control circuit applying a voltage for each pixel, to drive the electrophoretic device. Therefore, the number of applications of a first voltage and the number of applications of a second voltage are counted for each pixel, and at an arbitrary timing following start of display, when the number of applications of the second voltage in a first pixel is smaller than that in a second pixel, the second voltage is applied to the first pixel, to bring this smaller number of applications closer to the number of applications in the second pixel. Accordingly, display performance is allowed to be improved.

BRIEF DESCRIPTION OF DRAWINGS

FIG. 6 is a diagram used to describe the method of driving the display unit (the number of voltage applications for each pixel).

MODES FOR CARRYING OUT THE INVENTION

An embodiment of the present technology will be described below in detail with reference to the drawings. It is to be noted that the order in which the description will be provided is as follows.
1. Display unit
   1-1. Configuration
   1-2. Operation (a method of driving)
   1-3. Modifications
2. Application examples (electronic apparatuses) of display unit <1. Display Unit: 1-1. Configuration>

Figure 1:
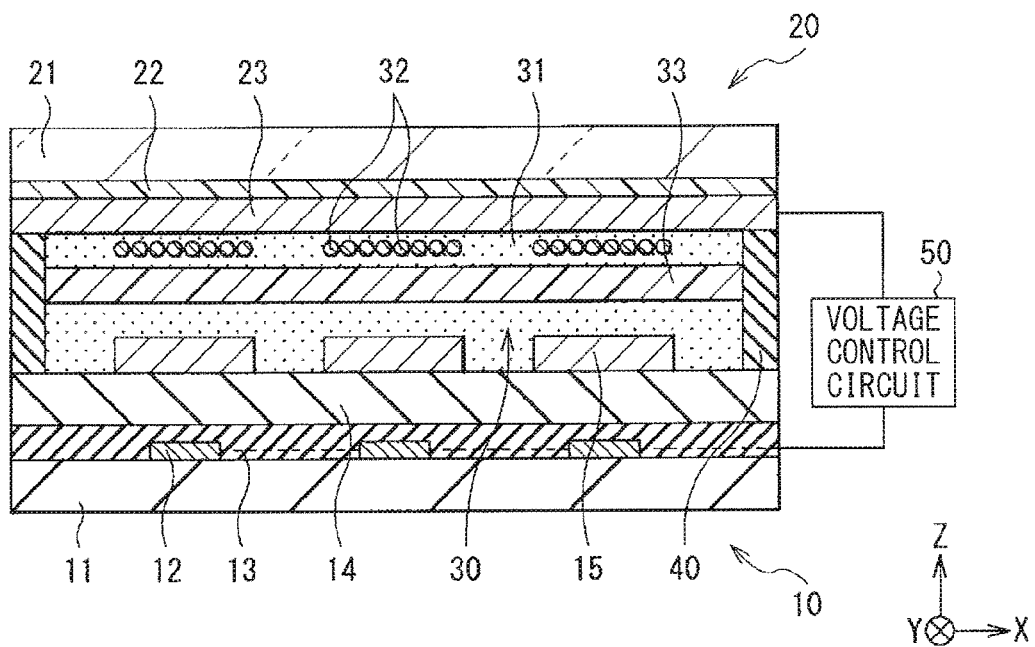
FIG. 1 is a block diagram illustrating a configuration of a display unit in an embodiment of the present technology.
Figure 2:
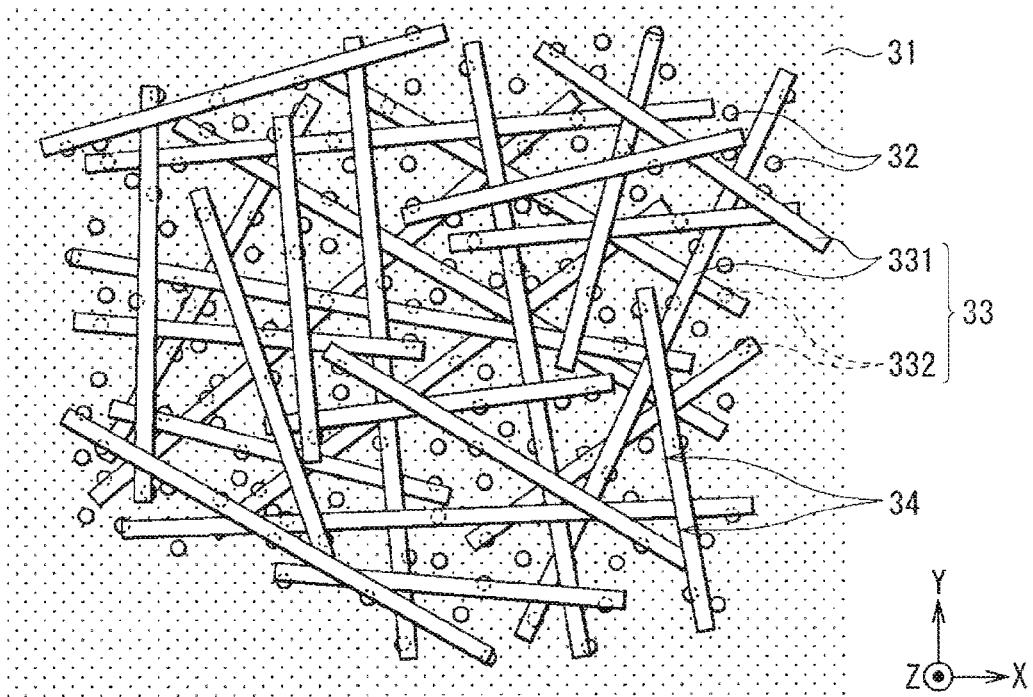
FIG. 2 is a plan view illustrating a configuration of a main part of the display unit.

First, a configuration of a display unit of an embodiment of the present technology will be described. FIG. 1 illustrates a block configuration of the display unit, and FIG. 2 illustrates a plane configuration of a main part of the display unit illustrated in FIG. 1. This display unit is applicable to an electronic apparatus for any of various uses, and the type of the electronic apparatus is not limited in particular.

This display unit is an electrophoretic display unit that displays an image by utilizing an electrophoretic phenomenon, and is a so-called electronic paper display. This display unit may include, for example, as illustrated in FIG. 1, a drive substrate 10 and a display substrate 20 disposed to face each other with an electrophoretic device 30 and a pacer 40 in between, and further include a voltage control circuit 50 connected to the drive substrate 10 and the display substrate 20. The display unit described here may be, for example, capable of displaying a color image, and may display an image on the display substrate 20 side.

[Drive Substrate]

The drive substrate 10 may be, for example, a substrate in which a thin-film transistor (TFT) 12, a protective layer 13, a planarizing insulating layer 14, and a pixel electrode 15 are laminated in this order, on one surface of a support base 11. In this drive substrate 10, for example, the TFT 12 and the pixel electrode 15 are formed to be divided in a matrix corresponding to a pixel arrangement, to build a drive circuit of an active matrix system.

The support base 11 may be formed of, for example, any one kind or two or more kinds of an inorganic material, a metallic material, a plastic material, and the like. Examples of the inorganic material may include silicon (Si), silicon oxide ($SiO_x$), silicon nitride ($SiN_x$), and aluminum oxide ($AlO_x$). Examples of the silicon oxide may include glass and spin-on-glass (SOG). Examples of the metallic material may include aluminum (Al), nickel (Ni), and stainless steel. Examples of the plastic material may include polycarbonate (PC), polyethylene terephthalate (PET), polyethylene naphthalate (PEN), and polyether ether ketone (PEEK).

This support base 11 may be optically transparent, or may be optically non-transparent. This is because an image is displayed at the display substrate 20 and therefore, the support base 11 may not be necessarily optically transparent. Further, the support base 11 may be a rigid substrate such as a wafer, or may be a thin-layer of glass, a film, or the like having flexibility, but above all, the support base 11 may be preferably the latter. This is because a flexible (foldable) display unit is achievable.

The TFT 12 is a switching device provided to select a pixel. This TFT 12 may be, for example, an inorganic TFT using an inorganic semiconductor layer such as amorphous silicon, polysilicon, oxide, or the like as a channel layer, or an organic TFT using an organic semiconductor layer such as pentacene. The protective layer 13 and the planarizing insulating layer 14 may include, for example, any one kind or two or more kinds of insulating materials such as polyimide. However, the planarizing insulating layer 14 may be absent, if a surface of the protective layer 13 is flat enough.

The pixel electrode 15 may include, for example, any one kind or two or more kinds of conductive materials such as gold (Au), silver (Ag), and copper (Cu). This pixel electrode 15 is connected to the TFT 12 through a contact hole (not illustrated) provided in the protective layer 13 and the planarizing insulating layer 14. It is to be noted that the number of the TFTs 12 disposed to correspond to the one pixel electrode 15 is arbitrary, and therefore may be two or more, without being limited to one.

[Display Substrate]

The display substrate 20 may be, for example, a substrate in which a color filter 22 and a counter electrode 23 are laminated in this order, on one surface of a support base 21.

The support base 21 is formed of a material similar to that of the support base 11, except that the support base 2 is optically transparent. This is because an image is displayed on the display substrate 20 side and therefore, it is necessary for the support base 21 to be optically transparent.

The color filter 22 may include, for example, a filter region (not illustrated in FIG. 1) of a color different for each pixel, and the colors, number, arrangement, and the like of the filter regions are arbitrary. A combination of the filter colors will be described later, by way of example (see FIG. 4 and FIG. 5). It is to be noted that the color filter 22 may be drawn directly on the one surface of the support base 21, or may be fixed to the support base 21 with an adhesive and/or the like. Further, preferably, a center location of each filter region and a center location of each pixel (the pixel electrode 15) may agree with each other as much as possible, and more specifically, may be preferably aligned within one-tenth of an array period of the filter region and the pixel electrode 15.

The counter electrode 23 may include, for example, any one kind or two or more kinds of optically-transmissive conductive materials (transparent electrode materials). Examples of the optically-transmissive conductive materials may include indium tin oxide (ITO), antimony tin oxide (ATO), fluorine-doped tin oxide (FTO), and aluminum-doped zinc oxide (AZO). This counter electrode 23 may be formed, for example, over the entire one surface of the support base 21, but may be formed to be divided in a manner similar to that of the pixel electrode 15.

When an image is displayed on the display substrate 20 side, the electrophoretic device 30 is viewed through the counter electrode 23. Therefore, optical transmittance of the counter electrode 23 may be preferably as high as possible, and may be, for example, 80% or more. In addition, electrical resistance of the counter electrode 23 may be preferably as low as possible, and may be, for example, $100\Omega/\square$ or less.

[Electrophoretic Device]

The electrophoretic device 30 effects contrast by utilizing an electrophoretic phenomenon, and includes an electrophoretic particle 32 that is movable between the pixel electrode 15 and the counter electrode 23 in response to an electric field. To be more specific, the electrophoretic device 30 may include, for example, a porous layer 33 together with the electrophoretic particle 32, in insulating liquid 31.

[Insulating Liquid]

The insulating liquid 31 may be, for example, any one kind or two or more kinds of nonaqueous solvents such as organic solvent, and is, specifically, paraffin, isoparaffin, or the like. Preferably, a viscosity and a refractive index of this insulating liquid 31 may be as low as possible. This is because mobility (response speed) of the electrophoretic particle 32 improves, and energy (power to be consumed) necessary for movement of the electrophoretic particle 32 declines accordingly. In addition, this is also because a difference between the refractive index of the insulating liquid 31 and a refractive index of the porous layer 33 increases, which leads to a rise in optical reflectance of the porous layer 33.

It is to be noted that the insulating liquid 31 may include various materials as necessary. Examples of these materials may include a coloring agent, a charge control agent, a dispersion stabilizer, a viscosity modifier, a surfactant, and a resin.

The electrophoretic particle 32 is one or more charged particles, which are electrically movable, and dispersed in the insulating liquid 31. This electrophoretic particle 32 is movable between the pixel electrode 15 and the counter electrode 23 in the insulating liquid 31. Further, the electrophoretic particle 32 may be, for example, any one kind or two or more kinds of particles (powder) such as an organic pigment, an inorganic pigment, a dye, a carbon material, a metallic material, a metal oxide, glass, and a polymer material (resin). It is to be noted that the electrophoretic particle 32 may also be a crushed particle or a capsule particle of a resin solid content including the above-described particle. However, materials corresponding to the carbon material, the metallic material, the metal oxide, the glass, and the polymer material are excluded from materials corresponding to the organic pigment, the inorganic pigment, and the dye.

Examples of the organic pigment may include azo-based pigments, metal-complex-azo-based pigments, polycondensed azo-based pigments, flavanthrone-based pigments, benzimidazolone-based pigments, phthalocyanine-based pigments, quinacridone-based pigments, anthraquinone-based pigments, perylene-based pigments, perinone-based pigments, anthrapyridine-based pigments, pyranthrone-based pigments, dioxazine-based pigments, thioindigo-based pigments, isoindolinone-based pigments, quinophthalone-based pigments, and indanthrene-based pigments. Examples of the inorganic pigment may include flowers of zinc (zinc oxide), antimony white, carbon black, black iron oxide, titanium boride, red iron oxide, mapico yellow, minium, cadmium yellow, zinc sulphide, lithopone, barium sulfide, cadmium selenide, calcium carbonate, barium sulfate, lead chromate, lead sulfate, barium carbonate, white lead, and alumina white. Examples of the dye may include nigrosine-based dyes, azo-based dyes, phthalocyanine-based dyes, quinophthalone-based dyes, anthraquinone-based dyes, and methine-based dyes. Examples of the carbon material may include carbon black. Examples of the metallic material may include gold, silver, and copper. Examples of the metal oxide may include titanium oxide, zinc oxide, zirconium oxide, barium titanate, potassium titanate, copper-chromium oxide, copper-manganese oxide, copper-iron-manganese oxide, copper-chromium-manganese oxide, and copper-iron-chromium oxide. Examples of the polymer material may include a polymer compound into which a functional group having an optical absorption spectrum in a visible light region is introduced. As long as a polymer compound having the optical absorption spectrum in the visible light region is adopted, the kind thereof is not limited in particular.

The content (concentration) of the electrophoretic particle 32 in the insulating liquid 31 is not limited in particular, but may be, for example, 0.1 wt % to 10 wt %. This is because shieldability and mobility of the electrophoretic particle 32 are secured. In this case, when the content of the electrophoretic particle 32 is below 0.1 wt %, shielding of the porous layer 33 by the electrophoretic particle 32 may be difficult. On the other hand, when the content of the electrophoretic particle 32 is above 10 wt %, dispersibility of the electrophoretic particle 32 may decrease, making the electrophoretic particle 32 move less easily, thereby leading to a possibility of occurrence of agglomeration in some cases.

This electrophoretic particle 32 has arbitrary optical reflection properties (optical reflectance). The optical reflectance of the electrophoretic particle 32 is not limited in particular, but may be preferably set so that at least the electrophoretic particle 32 is allowed to shield the porous layer 33. This is to effect the contrast by utilizing a difference between the optical reflectance of the porous layer 33 and the optical reflectance of the electrophoretic particle 32.

Here, a specific material forming the electrophoretic particle 32 may be, for example, selected depending on a role played by the electrophoretic particle 32 to effect the contrast. Specifically, a material in a case in which bright display is performed by the electrophoretic particle 32 may be, for example, a metal oxide such as titanium oxide, zinc oxide, zirconium oxide, barium titanate, and potassium titanate. Above all, the titanium oxide may be preferable. This is because electrochemical stability, dispersibility, and the like are excellent, and high reflectance is obtained. On the other hand, a material in a case in which dark display is performed by the electrophoretic particle 32 may be, for example a carbon material, a metal oxide, or the like. Examples of the carbon material may include carbon black, and examples of the metal oxide may include copper-chromium oxide, copper-manganese oxide, copper-iron-manganese oxide, copper-chromium-manganese oxide, and copper-iron-chromium oxide. Above all, the carbon material may be preferable. This is because superior chemical stability, mobility, and light absorption property are obtained.

In the case in which bright display is performed by the electrophoretic particle 32, the color of the electrophoretic particle 32 visually recognized from outside is not limited in particular as long as it is possible to effect the contrast, but above all, a color close to white may be preferable, and white may be more preferable. On the other hand, in the case in which dark display is performed by the electrophoretic particle 32, the color of the electrophoretic particle 32 visually recognized from outside is not limited in particular as long as it is possible to effect the contrast, but above all, a color close to black may be preferable, and black may be more preferable. This is because the contrast is improved in either case.

It is to be noted that, preferably, the electrophoretic particle 32 may be readily dispersed and charged in the insulating liquid 31 for a long time, while being less easily adsorbed on the porous layer 33. Therefore, a dispersant (or an electric charge modifier) intended to disperse the electrophoretic particle 32 by electrostatic repulsion may be used, or a surface treatment may be applied to the electrophoretic particle 32, or both may be adopted.

Examples of the dispersant may include the Solsperse series available from The Lubrizol Corporation, the BYK series as well as the Anti-Terra series available from BYK-Chemie GmbH, and the Span series available from ICI America.

Examples of the surface treatment may include a rosin treatment, a surfactant treatment, a pigment derivative processing, a coupling agent treatment, a graft polymerization treatment, and a microencapsulation treatment. Above all, any of the graft polymerization treatment, the microencapsulation treatment, and a combination of these treatments may be preferable. This is because long-term dispersion stability is obtained.

Examples of a material used for the surface treatment may include a material (an adsorptive material) that has a functional group capable of being adsorbed on a surface of the electrophoretic particle 32 and a polymeric functional group. The kind of the functional group capable of being adsorbed is determined according to the material forming the electrophoretic particle 32. For example, an aniline derivative such as 4-vinyl aniline may be selected for the carbon material such as carbon black, and an organosilane derivative such as methacrylate-3-(trimethoxysilyl)propyl may be selected for the metal oxide. Examples of the polymeric functional group may include a vinyl group, an acrylic group, and a methacryl group.

Further, the material for the surface treatment may be, for example, a material (a graft material) capable of being grafted onto the surface of the electrophoretic particle 32 on which the polymeric functional group is introduced. This graft material may have, preferably, a polymeric functional group and a functional group for dispersion. The functional group for dispersion is capable of dispersion in the insulating liquid 31, and also capable of maintaining dispersibility by steric hindrance. The kind of the polymeric functional group is similar to that in the case described for the adsorptive material. When the insulating liquid 31 is, for example, paraffin, the functional group for dispersion may be a branched-alkyl group or the like. In order to cause polymerization and graft of the graft material, a polymerization initiator such as azobisisobutyronitrile (AIBN), for example, may be used.

For reference, details of the way of dispersing the electrophoretic particle 32 in the insulating liquid 31 as described above are described in books such as "Dispersion technology of ultrafine particles and evaluation thereof: surface treatment and fine grinding, as well as dispersion stability in air/liquid/polymer (Science & Technology Co., Ltd.)".

[Porous Layer]

The porous layer 33 may be, for example, a three-dimensional structure (an irregular network structure such as a nonwoven fabric) formed using a fibrous structure 331, as illustrated in FIG. 2. This porous layer 33 has a plurality of clearances (pores 34) through which the electrophoretic particle 32 is allowed to pass, and which are provided at locations where the fibrous structure 331 is not present. It is to be noted that, in FIG. 1, illustration of the porous layer 33 is simplified.

One or more non-migrating particles 332 are included in the fibrous structure 331, and the non-migrating particle 332 is held by the fibrous structure 331. In the porous layer 33 which is a three-dimensional structure, the single fibrous structure 331 may be twisted at random, or a plurality of fibrous structures 331 may be gathered and stacked at random, or both manners may be mixed. In the case of the plurality of fibrous structures 331, preferably, each of the fibrous structures 331 may hold the one or more non-migrating particles 332. It is to be noted that FIG. 2 illustrates the case in which the porous layer 33 is formed using the plurality of fibrous structures 331.

The porous layer 33 is the three-dimensional structure because diffused reflection (multiple scattering) of outside light is easily caused by this irregular three-dimensional structure and therefore, the optical reflectance of the porous layer 33 increases, and the porous layer 33 may be thin to achieve high optical reflectance. This improves the contrast, and reduces energy necessary to move the electrophoretic particle 32. Further, an average pore size of the pore 34 is made large, and the number thereof is increased and therefore, the electrophoretic particle 32 is allowed to move through the pores 34 more easily. This reduces the time necessary to move the electrophoretic particle 32, and also reduces the energy necessary to move the electrophoretic particle 32.

The non-migrating particle 332 is included in the fibrous structure 331, because the diffused reflection of outside light more easily occurs and therefore, the optical reflectance of the porous layer 33 further increases. This improves the contrast further.

The fibrous structure 331 is a fibrous substance having a length that is sufficiently long relative to a fiber diameter (a diameter). For example, this fibrous structure 331 may include any one kind or two or more kinds of a polymer material, an inorganic material, and the like, or may include other material. Examples of the polymer material may include nylon, polylactic acid, polyamide, polyimide, polyethylene terephthalate, polyacrylonitrile, polyethyleneoxide, polyvinylcarbazole, polyvinyl chloride, polyurethane, polystyrene, polyvinyl alcohol, polysulfone, polyvinylpyrrolidone, polyvinylidene fluoride, polyhexafluoropropylene, cellulose acetate, collagen, gelatin, chitosan, and copolymers of these materials. Examples of the inorganic material may include titanium oxide. Above all, the polymer material may be preferably used for the fibrous structure 331. This is because reactivity (photoreactivity etc.) of the polymer material is low (chemically stable) and therefore, an unintended decomposition reaction of the fibrous structure 331 is prevented. It is to be noted that when the fibrous structure 331 is configured of a material with high reactivity, preferably, a surface of the fibrous structure 331 may be coated with an arbitrary protective layer.

The fibrous structure 331 is not limited in particular in terms of shape (appearance), as long as the length of the fiber diameter is sufficiently long relative to the fiber diameter as described above. Specifically, the fibrous structure 331 may be linear, curled, or bent at some point. Alternatively, the fibrous structure 331 may be branched at some point to extend in one or two directions, without being limited to only extending in one direction. The fibrous structure 331 is not limited in particular in terms of a formation method, but may be preferably formed by, for example, a phase separation method, a phase inversion method, an electrostatic (electric field) spinning method, a melt spinning method, a wet spinning method, a dry spinning method, a gel spinning method, a sol-gel method, a spray coating method, or the like. This is because it is easy to form a fibrous substance having a length sufficiently long relative to a fiber diameter, in a simple and stable manner.

An average fiber diameter of the fibrous structure 331 is not limited in particular, but may be preferably as small as possible. This is because the diffused reflection of light easily occurs, and the average pore size of the pore 34 is made large. However, it is necessary to determine the average fiber diameter so that the fibrous structure 331 is able to hold the non-migrating particle 332. For this reason, preferably, the average fiber diameter of the fibrous structure 331 may be 10 µm or less. It is to be noted that a lower limit of the average fiber diameter is not limited in particular, but may be, for example, 0.1 µm or lower. This average fiber diameter may be measured by, for example, microscopy using a scanning electron microscope (SEM). It is to be noted that an average length of the fibrous structure 331 may arbitrary.

The average pore size of the pore 34 is not limited in particular, but above all, may be preferably as large as possible. This is because the electrophoretic particle 32 is allowed to pass through the pore 34 easily. Therefore, preferably, the average pore size of the pore 34 may be 0.1 µm to 10 µm.

A thickness of the porous layer 33 is not limited in particular, but may be, for example, 5 µm to 100 µm. This is because shield properties of the porous layer 33 improve, and the electrophoretic particle 32 is allowed to pass through the pore 34 easily.

In particular, the fibrous structure 331 may be preferably a nanofiber. This is because the three-dimensional structure becomes complicated to easily cause the diffused reflection of light and therefore, the reflectance of the porous layer 33 further improves, and also, a proportion of the pores 34 occupying a unit volume is made large and therefore, the electrophoretic particle 32 is allowed to pass through the pores 34 easily. This improves the contrast, and also makes it possible to reduce the energy necessary for the movement of the electrophoretic particle 32. The nanofiber is a fibrous substance having a fiber diameter of 0.001 µm to 0.1 µm, and a length that is 100 times or more of the fiber diameter. The fibrous structure 331 made of the nanofiber may be preferably formed by an electrostatic spinning method using a polymer material. This is because it is easy to form the fibrous structure 331 having a small fiber diameter, in a simple and stable manner.

This fibrous structure 331 may preferably have optical reflection properties different from those of the electrophoretic particle 32. Specifically, optical reflectance of the fibrous structure 331 is not limited in particular, but may be preferably set so that at least the porous layer 33 as a whole is allowed to shield the electrophoretic particle 32. This is to effect the contrast by utilizing the difference between the optical reflectance of the electrophoretic particle 32 and the optical reflectance of the porous layer 33 as described above. Accordingly, the fibrous structure 331 having optical transparency (colorlessness and transparency) in the insulating liquid 31 may be undesirable. However, when the optical reflectance of the fibrous structure 331 hardly affects the optical reflectance of the entire porous layer 33, and the optical reflectance of the entire porous layer 33 is determined substantially by optical reflectance of the non-migrating particle 332, the optical reflectance of the fibrous structure 331 may be arbitrary.

The non-migrating particle 332 is a particle fixed to the fibrous structure 331, without being electrophoresed. The material forming this non-migrating particle 332 may be, for example, similar to the material forming the electrophoretic particle 32, and may be selected depending on a role played by the non-migrating particle 332, as will be described later.

It is to be noted that the non-migrating particle 332 may be partially exposed from the fibrous structure 331, or may be embedded therein, as long as the non-migrating particle 332 is held by the fibrous structure 331.

This non-migrating particle 332 has optical reflection properties different from those of the electrophoretic particle 32. The optical reflectance of the non-migrating particle 332 is not limited in particular, but may be preferably set so that at least the porous layer 33 as a whole is allowed to shield the electrophoretic particle 32. This is to effect the contrast by utilizing the difference between the optical reflectance of the electrophoretic particle 32 and the optical reflectance of the porous layer 33 as described above.

Here, a specific material forming the non-migrating particle 332 may be, for example, selected depending on a role played by the non-migrating particle 332 to effect the contrast. Specifically, a material in a case in which bright display is performed by the non-migrating particle 332 is similar to the material of the electrophoretic particle 32 selected in the case of performing bright display. On the other hand, a material in a case in which dark display is performed by the non-migrating particle 332 is similar to the material of the electrophoretic particle 32 selected in the case of dark display.

Above all, for the material selected in the case in which bright display is performed by the non-migrating particle 332, a metal oxide is preferable, and a titanium oxide is more preferable. This is because electrochemical stability, fixity, and the like are excellent, and high reflectance is obtained. The material forming the non-migrating particle 332 may be the kind same as or different from that of the material forming the electrophoretic particle 32, as long as it is possible to effect the contrast.

It is to be noted that a color visually recognized in the case in which bright display or dark display is performed by the non-migrating particle 332 is similar to that in the case described for the color when the electrophoretic particle 32 is visually recognized.

An example of a procedure of forming the porous layer 33 is as follows. First, the material (for example, a polymer material) forming the fibrous structure 331 is dispersed and dissolved in an organic solvent, to prepare a spinning solution. Subsequently, the non-migrating particles 332 are added to the spinning solution, and then sufficiently stirred so that the non-migrating particles 332 are dispersed in the spinning solution. Finally, spinning is performed by an electrostatic spinning method using the spinning solution. As a result, the non-migrating particle 332 is held by the fibrous structure 331 and therefore, the porous layer 33 is formed.

[Preferable Display Method of Electrophoretic Device]

In this electrophoretic device 30, as described above, the contrast is effected utilizing the difference between the optical reflectance of the electrophoretic particle 32 and the optical reflectance of the porous layer 33. In this case, dark display may be performed by the electrophoretic particle 32 and bright display may be performed by the porous layer 33, or vice versa. Such a difference in role is determined by a magnitude relation between the optical reflectance of the electrophoretic particle 32 and the optical reflectance of the porous layer 33. In other words, the optical reflectance of the one performing bright display is set to be greater than the optical reflectance of the other performing dark display.

Above all, preferably, dark display may be performed by the electrophoretic particle 32 and bright display may be performed by the porous layer 33, because the optical reflectance of the porous layer 33 is higher than the optical reflectance of the electrophoretic particle 32. Accordingly, when the optical reflectance of the porous layer 33 is substantially determined by the optical reflectance of the non-migrating particle 332, the optical reflectance of the non-migrating particle 332 may be preferably higher than the optical reflectance of the electrophoretic particle 32. This is because the optical reflectance of bright display becomes considerably high by utilizing the diffused reflection of the outside light by the porous layer 33 and therefore, the contrast also becomes considerably high accordingly.

[Spacer]

The spacer 40 may include, for example, an insulating material such as a polymer material. However, a configuration of the spacer 40 is not limited in particular, and a seal material mixed with fine particles may be used.

A shape of the spacer 40 is not limited in particular. However, above all, the spacer 40 may preferably have a shape which does not interfere with the movement of the electrophoretic particle 32 while being capable of uniform distribution thereof, and may be, for example, a grid. Further, a thickness of the spacer 40 is not limited in particular, but may be preferably as thin as possible to reduce the power to be consumed, and may be, for example, 10 μm to 100 μm. It is to be noted that, in FIG. 1, a simplified configuration of the spacer 40 is illustrated.

[Voltage Control Circuit]

The voltage control circuit 50 applies, for each pixel, a voltage between the pixel electrode 15 and the counter electrode 23, to drive the electrophoretic device 30 (to move the electrophoretic particle 32). This voltage control circuit 50 may be, for example, connected to the pixel electrode 15 through the TFT 12, and also connected to the counter electrode 23. It is to be noted that the voltage control circuit 50 may include, for example, a driver for voltage control, a power supply, a memory, and the like to control a drive circuit of an active matrix system, and may be capable of selecting any one or more of a plurality of TFTs 12.

At the time of image display, the voltage control circuit 50 applies a raising voltage (a first voltage) to move the electrophoretic particle 32 towards the pixel electrode 15 for each pixel. Further, the voltage control circuit 50 applies a lowering voltage (a second voltage) to move the electrophoretic particle 32 towards the counter electrode 23 for each pixel.

In particular, the voltage control circuit 50 has a function of counting the number (hereinafter referred to as "raising number") of applications of the raising voltage and the number (hereinafter referred to as "lowering number") of applications of the lowering voltage, for each pixel, in order to control a drive state of the display unit. Based on a result of this counting, the voltage control circuit 50 additionally applies the raising voltage to a specific pixel, at an arbitrary timing following the start of image display. To be more specific, when determining that the lowering number in part of pixels is smaller than those in other pixels, the voltage control circuit 50 applies the lowering voltage to the pixel with the smaller number of applications, to bring this number of applications closer to the lowering numbers in other pixels. However, the color of the filter region corresponding to the part of the pixels is different from the colors of the filter regions corresponding to the other pixels.

It is to be noted that the function of the voltage control circuit 50 will be described below more in detail.

<1-2. Operation (Method of Driving)>

[Display Principle of Color Image]

Next, operation of the display unit will be described. Here, a case in which dark display is performed by the electrophoretic particle 32 and bright display is performed by the porous layer 33 is taken as an example.

Figure 3:
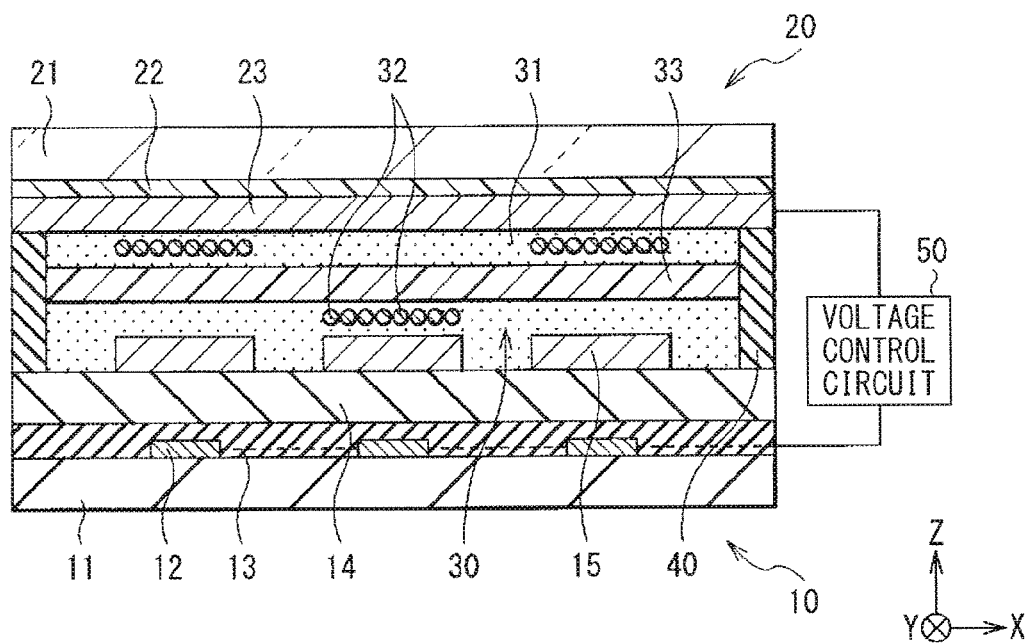
FIG. 3 is a block diagram used to describe operation of the display unit.
Figure 4:
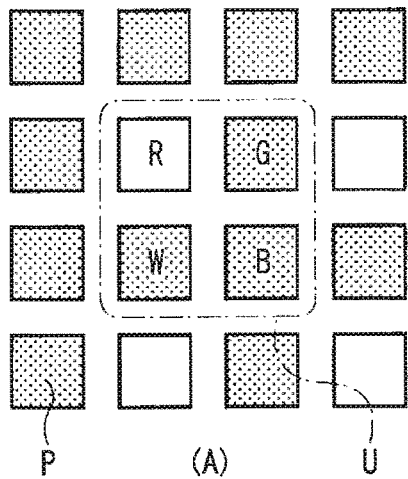
FIG. 4 is a diagram used to describe a method of driving the display unit (a display state of each pixel).
Figure 4:
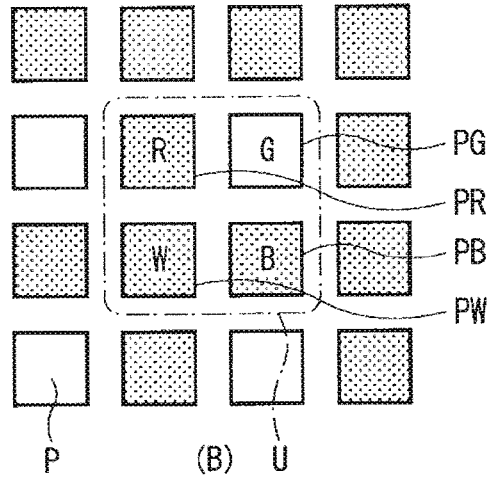
Figure 4:
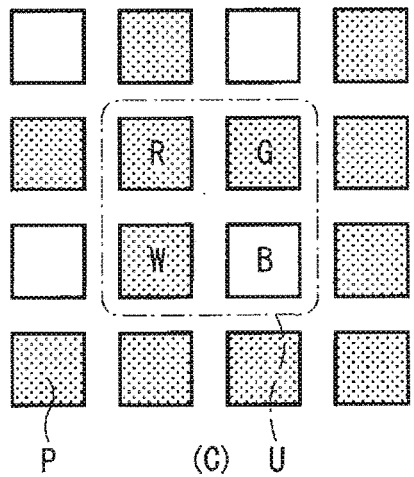
Figure 4:
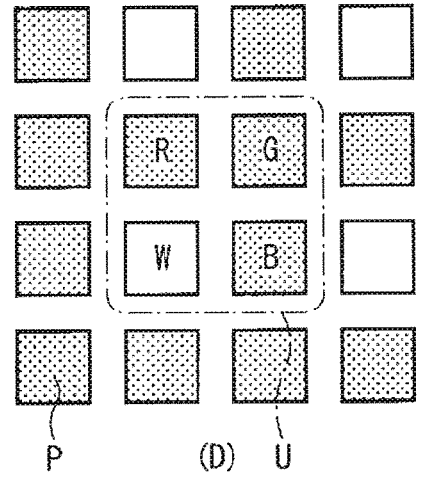
Figure 4:
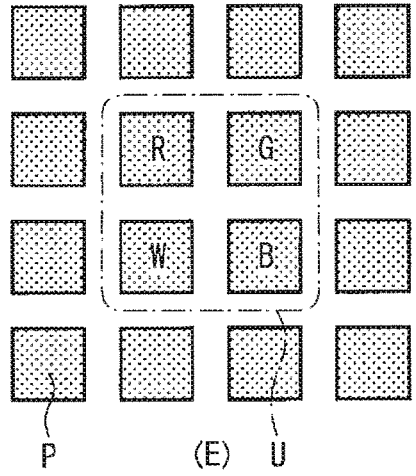
Figure 5:
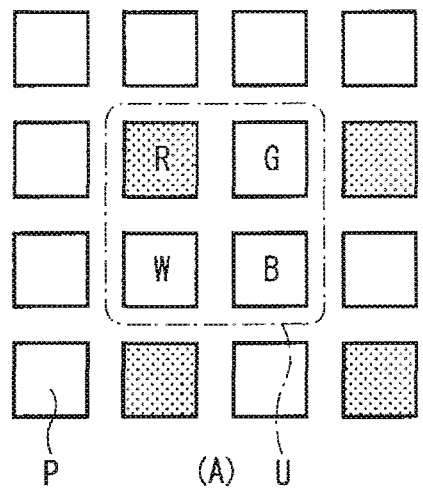
FIG. 5 is another diagram used to describe the method of driving the display unit (a display state of each pixel).
Figure 5:
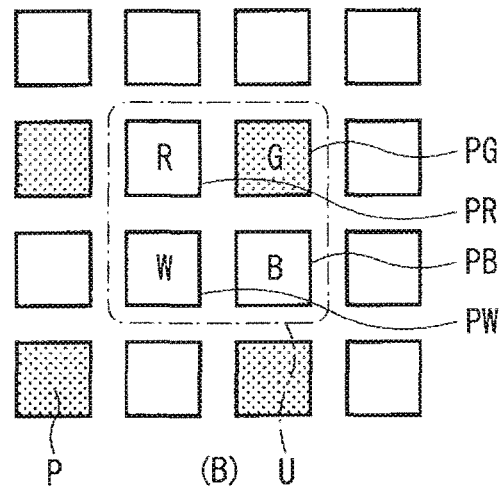
Figure 5:
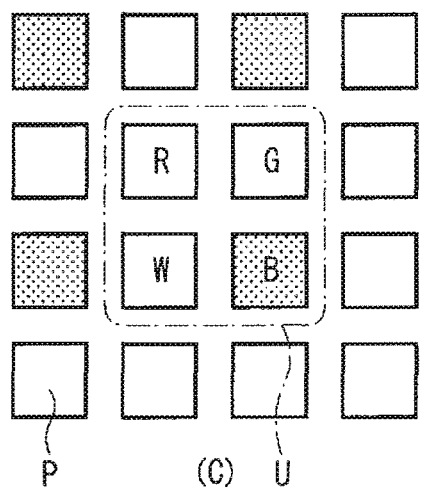
Figure 5:
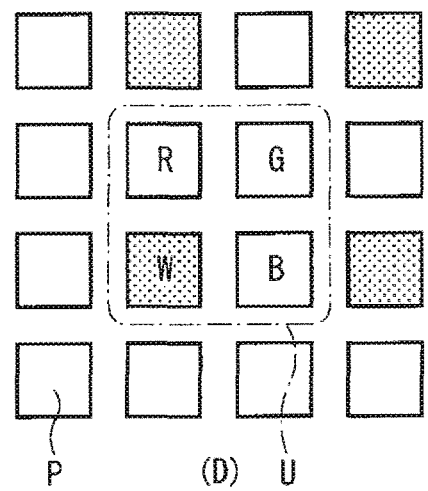
Figure 5:
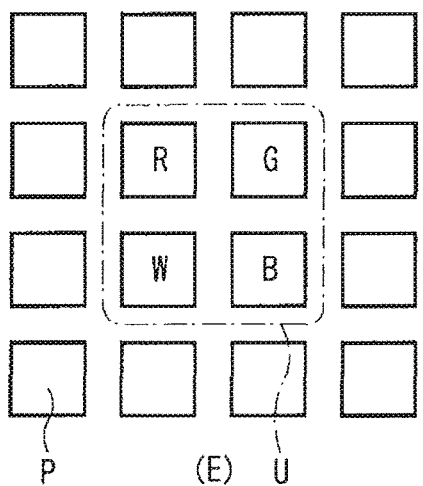
Figure 5:
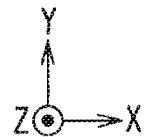

FIG. 3 is a diagram used to describe the operation of the display unit, and illustrates a block configuration corresponding to FIG. 1. FIGS. 4 to 6 are diagrams used to describe a method of driving the display unit. FIG. 4 and FIG. 5 each illustrate a display state (bright display or dark display) of each of the pixels P, and FIG. 6 illustrates the number of voltage applications for each of the pixels P. It is to be noted that FIG. 4 illustrates a display state when viewed from a front side (the display substrate 20 side) of the electrophoretic device 30, and FIG. 5 illustrates a display state when viewed from a back side (the drive substrate 10 side) of the same. Further, R, G, B, and W illustrated in FIG. 4 and FIG. 5 each represent the filter color of the color filter 22.

As illustrated in FIG. 4 and FIG. 5, a plurality of pixels P may be arranged, for example, in a matrix (rows by columns). A pixel unit U configured of four pixels P among the plurality of pixels P includes pixels PR, PG, PB, and PW. The pixel PR, the pixel PG, the pixel PB, and the pixel PW correspond to a red filter region (R), a green filter region (G), a blue filter region (B), and a white (transparent) filter region (W), respectively, and the pixels are capable of emitting light of the respective colors.

It is to be noted that the arrangement of the four pixels P (PR, PG, PB, and PW) used to configure the pixel unit U may be arbitrarily modified, without being limited to a matrix. For example, the four pixels P may be arranged in a line.

In this display unit, in the initial state, the electrophoretic particles 32 is located on the side closer to the counter electrode 23 in all the pixels P as illustrated in FIG. 1 and therefore, dark display is performed by the electrophoretic particle 32 in the electrophoretic device 30 as a whole. This prevents the contrast from being effected and therefore, an image non-display state is established.

When the pixel P is selected by the voltage control circuit 50 through the TFT 12, and the raising voltage is applied between the pixel electrode 15 and the counter electrode 23, the electrophoretic device 32 of the pixel P moves towards the pixel electrode 15 and therefore, bright display is performed by the porous layer 33. As a result, of outside light (white light) reflected by the porous layer 33, light of a specific wavelength passing through the filter region of a specific color of the color filter 22 is released to the outside through the display substrate 20. For this reason, red light is generated in the red filter region, and similarly, light of a color corresponding to each filter color is also generated in each of the green, blue, and white filter regions.

Subsequently, when the pixel P is selected again by the voltage control circuit 50 through the TFT 12, and the lowering voltage is applied between the pixel electrode 15 and the counter electrode 23, the electrophoretic device 32 after moving in the pixel P moves towards the counter electrode 23. As a result, dark display is performed again by the electrophoretic particle 32.

Due to these applications of the raising voltage and the lowering voltage, the pixel P in a bright display state and the pixel P in a dark display state coexist, and also combined light of the light generated from each of the pixels P is visually recognized, when the electrophoretic device 30 is viewed from the display substrate 20 side. Therefore, in the electrophoretic device 30 as a whole, the contrast is effected utilizing a difference between display colors in each of the pixel units U, and also a hue is determined by additive mixture of colors. The display color is thus switched for each of the pixel units U, and a color image is thereby displayed.

It is to be noted that when a color image is displayed, the amount of movement of the electrophoretic particle 32 is controlled by changing an application time of the raising voltage applied to each of the pixels P, or changing the strength of this raising voltage. This makes it possible to perform gray-scale display for each of the pixels P.

[Control of Driving Display Unit by Voltage Control Circuit]

Here, as illustrated in FIG. 4 and FIG. 5, a case in which the display state of the pixel unit U shifts in order of red, green, blue, and white is taken as an example. Here, the strength and the application time of each of the raising voltage and the lowering voltage to be applied to each of the pixels P are assumed to be constant.

As illustrated in FIG. 3 and Parts (A) to (E) of FIG. 4, in each of the pixels P, the electrophoretic particle 32 is located on the side closer to the counter electrode 23, in response to the lowering voltage, in the dark display state. Further, in each of the pixels P, the electrophoretic particle 32 is on the side closer to the pixel electrode 15 in response to the raising voltage, in the bright display state.

First, in the initial state (when all the pixels P are in the dark display state), the voltage control circuit 50 selects the TFT 12 corresponding to the pixel PR in response to an external signal, and applies the raising voltage between the pixel electrode 15 corresponding to the selected TFT 12 and the counter electrode 23. As a result, the electrophoretic particle 32 of the pixel PR moves towards the pixel electrode 15 and therefore, the pixel PR enters the bright display state.

In this case, as illustrated in Part (A) of FIG. 4 and Part (A) of FIG. 5, in the pixel PR, bright display (red display) is performed by the red filter region (R) of the color filter 22 on the front side of the electrophoretic device 30, and dark display is performed by the electrophoretic particle 32 on the back side. As a result, the raising number of the pixel PR is one, as illustrated in Part (A) of FIG. 6.

Subsequently, the voltage control circuit 50 selects the TFT 12 corresponding to the pixel PG in response to an external signal, and applies the raising voltage between the pixel electrode 15 corresponding to the selected TFT 12 and the counter electrode 23. As a result, the electrophoretic particle 32 of the pixel PG moves towards the pixel electrode 15 and therefore, the pixel PR enters the bright display. Accordingly, the voltage control circuit 50 applies the lowering voltage between the pixel electrode 15 corresponding to the pixel PR and the counter electrode 23, thereby moving the electrophoretic particle 32 of the pixel PR towards the counter electrode 23. Therefore, the pixel PR returns to the dark display state.

In this case, as illustrated in Part (B) of FIG. 4 and Part (B) of FIG. 5, in the pixel PG, bright display (green display) is performed on the front side by the green filter region (G) of the color filter 22, and dark display is performed on the back side by the electrophoretic particle 32. Further, in the pixel PR, dark display is performed on the front side by the electrophoretic particle 32, and bright display is performed on the back side by the porous layer 33. As a result, as illustrated in Part (B) of FIG. 6, the raising number of each of the pixels PR and PG is one, and the lowering number of the pixel PR is one.

At the time of switching from the red display to the green display, when the lowering voltage is applied to the pixel PR, an electric field is generated between the pixel electrode 15 of the pixel PG and the pixel electrode 15 of the pixel PR unintentionally. As a result, of the electrophoretic particles 32 which are originally supposed to move towards the counter electrode 23 of the pixel PR, some move towards the pixel PG (the pixel electrode 15 of the pixel PG) adjacent thereto, under the influence of the electric field described above. As a result, even if density (hereinafter referred to as "particle density") of the electrophoretic particle 32 in the pixel PR and that in the pixel PG are the same in the initial state (the image non-display state), the particle density in the pixel PG is greater than that in the pixel PR in a green display state and therefore, the pixels PR and PG vary in particle density.

It is to be noted that, at the time of applying the lowering voltage in the pixel PR, an electric field is generated unintentionally, not only between the pixel electrode 15 of the pixel PG and the pixel electrode 15 of the pixel PR, but also between the pixel electrode 15 of the pixel PG and the pixel electrode 15 of each of the pixels PB and PW. For this reason, part of the electrophoretic particles 32, which are supposed to move to the counter electrode 23 of the pixel PR, may move towards not only the counter electrode 23 of the pixel PG, but the counter electrode 23 of each of the pixels PB and PW, in some cases. The same is true for the time when the lowering voltage is applied in each of the pixels PB and PW which will be described later.

Subsequently, the voltage control circuit 50 selects the TFT 12 corresponding to the pixel PB in response to an external signal, and applies the raising voltage between the pixel electrode 15 corresponding to the selected TFT 12 and the counter electrode 23. As a result, the electrophoretic particle 32 of the pixel PB moves towards the pixel electrode 15 and therefore, the pixel PB enters the bright display state. Accordingly, the voltage control circuit 50 applies the lowering voltage between the pixel electrode 15 corresponding to the pixel PG and the counter electrode 23, thereby moving the electrophoretic particle 32 of the pixel PG towards the counter electrode 23. Therefore, the pixel PG returns to the dark display state.

In this case, as illustrated in Part (C) of FIG. 4 and Part (C) of FIG. 5, in the pixel PB, bright display (blue display) is performed on the front side by the blue filter region (B) of the color filter 22, and dark display is performed on the back side by the electrophoretic particle 32. Further, in the pixel PG, dark display is performed on the front side by the electrophoretic particle 32, and bright display is performed on the back side by the porous layer 33. As a result, as illustrated in Part (C) of FIG. 6, the raising number of each of the pixels PR, PG, and PB is one, and the lowering number of each of the pixels PR and PG is one.

At the time of switching from the green display to the blue display as well, for a reason similar to that at the time of switching from the red display to the green display, part of the electrophoretic particles 32, which are supposed to move towards the counter electrode 23 of the pixel PG, moves unintentionally towards the pixel PB (the pixel electrode 15 of the pixel PB) adjacent thereto. As a result, the particle density in the pixel PB is greater than that in the pixel PG in a blue display state and therefore, the pixels PG and PB also vary in particle density.

Subsequently, the voltage control circuit 50 selects the TFT 12 corresponding to the pixel PW in response to an external signal, and applies the raising voltage between the pixel electrode 15 corresponding to the selected TFT 12 and the counter electrode 23. As a result, the electrophoretic particle 32 of the pixel PW moves towards the pixel electrode 15 and therefore, the pixel PW enters the bright display state. Accordingly, the voltage control circuit 50 applies the lowering voltage between the pixel electrode 15 corresponding to the pixel PB and the counter electrode 23, thereby moving the electrophoretic particle 32 of the pixel PB towards the counter electrode 23. Therefore, the pixel PB returns to the dark display state.

In this case, as illustrated in Part (D) of FIG. 4 and Part (D) of FIG. 5, in the pixel PW, bright display (white display) is performed on the front side by the white filter region (W) of the color filter 22, and dark display is performed on the back side by the electrophoretic particle 32. Further, in the pixel PB, dark display is performed on the front side by the electrophoretic particle 32, and bright display is performed on the back side by the porous layer 33. As a result, as illustrated in Part (D) of FIG. 6, the raising number of each of the pixels PR, PG, PB, and PD is one, and the lowering number of each of the pixels PR, PG, and PB is one.

At the time of switching from the blue display to the white display as well, for a reason similar to that at the time of switching from the red display to the green display, part of the electrophoretic particles 32, which are supposed to move towards the counter electrode 23 of the pixel PB, moves unintentionally towards the pixel PW (the pixel electrode 15 of the pixel PW) adjacent thereto. As a result, the particle density in the pixel PW is greater than that in the pixel PB in a white display state and therefore, the pixels PB and PW also vary in particle density.

By the above-described process, in the white display state, the particle density of the pixel PW becomes greater than those of the pixels PR, PG, and PB. As a result, for example, when the red display is performed by the pixel PR again after the white display, the color density in the dark display state may become greater in the pixel PW than those in the pixels PG and PB and therefore, display unevenness may occur due to the difference between the color densities. A cause of the occurrence of this display unevenness is that, as apparent from Part (D) of FIG. 6, although the raising numbers of the respective pixels P agree with each other, the raising numbers are different. In other words, the lowering number of each of the pixels PR, PG, and PB (a second pixel) is one, whereas the lowering number of the pixel PW (a first pixel) is zero.

Therefore, for example, after the white display, the voltage control circuit 50 may select the TFT 12 corresponding to the pixel PW, and additionally apply the lowering voltage between the pixel electrode 15 corresponding to the selected TFT 12 and the counter electrode 23. As a result, the electrophoretic particle 32 of the pixel PW moves towards the counter electrode 23. In this case, as illustrated in Part (E) of FIG. 4 and Part (E) of FIG. 5, in the pixel PW, dark display is performed on the front side, and bright display is performed on the back side. As a result, as illustrated in Part (E) of FIG. 6, the lowering number of any of the pixels PR, PG, PB, and PW is one and therefore, the lowering numbers of the respective pixels P are equal. In the following, the processing in which the voltage control circuit 50 brings the lowering numbers of the respective pixels P closer to each other as described above will be referred to as "processing of equalizing lowering numbers".

It is to be noted that "the processing of equalizing lowering numbers" described above is not limited to the processing of equalizing lowering numbers of the respective pixels P. For example, in a case of using a plurality of lowering numbers, this processing may be processing of bringing the lowering number of part (here, the pixel PW) of the pixels P closer to the lowering number of each of other pixels P (here, the pixels PR, PG, and PB). For example, in a case in which the lowering number of the part of the pixels P is zero, whereas the lowering number of each of the other pixels P is three, the lowering number of the part of the pixels P may be processed to become three, but may also be processed to become one or two.

When the lowering voltage is applied to the pixel PW, for a reason similar to that at the time of switching from the red display to the green display, part of the electrophoretic particles 32, which are supposed to move towards the counter electrode 23 of the pixel PW, moves unintentionally towards the pixel PR (the pixel electrode 15 of the pixel PR) adjacent thereto. By taking advantage of this unintentional migration phenomenon of the electrophoretic particle 32, an increase in local particle density in the pixel PW is eased and therefore, the particle densities of the pixels PR, PG, PB, and PW are substantially averaged. This suppresses the display unevenness.

In this way, at the time of driving the display unit, the voltage control circuit 50 performs the processing of equalizing lowering numbers at an arbitrary timing. In other words, the voltage control circuit 50 counts the number of applications of the raising voltage and the number of applications of the lowering voltage, for each of the pixels P. Then, for example, when determining that the number of applications of the lowering voltage is applied in part (here, the pixel PW) of the pixels P is small, the voltage control circuit 50 may additionally apply the lowering voltage to the pixel PW with the small number of applications, to bring this number of applications closer to the numbers of applications of the other pixels PR, PG, and PB. This improves particle density unevenness of the pixels P.

It is to be noted that "the arbitrary timing" at which the voltage control circuit 50 performs the processing of equalizing lowering numbers may be any timing after the start of image display by the display unit. For example, the timing at which the processing of equalizing is to be performed may be a point in time after a lapse of specific time following the start of image display by the display unit, or may be a point in time at which the raising number or the lowering number of a specific pixel P reaches a specific number. However, when a still image is displayed by the display unit, in order to prevent the display state of this still image from being divided, it may be preferable to adopt a timing at which a shift from the display state of a certain still image to the display state of the next still image takes place. Further, when a moving image is displayed by the display unit, it may be preferable to adopt a timing such as a scene change, for a similar reason.

[Functions and Effects of Display Unit and Method of Driving Same]

According to this display unit and the method of driving the same, the raising number and the lowering number are counted for each of the pixels P, and part of the pixels P that has the small lowering number is subjected to the processing of equalizing lowering numbers. In this case, as described above, the increase in local particle density in a specific pixel P is eased and therefore, the particle densities of the pixels P are substantially averaged. Accordingly, display unevenness is suppressed, which allows display performance to be improved. In particular, due to the suppression of the display unevenness, it is possible to control a display color by the additive mixture of colors more precisely, and it is also possible to set a gray scale associated with gray-scale display more minutely. Further, it is possible to display a high-quality image stably for a long time, by periodically performing the processing of equalizing lowering numbers.

<1-3. Modifications>

The number of the pixels P included in the pixel unit U, the display color (each filter color) and the arrangement of each of the pixels P, and the like are not limited in particular, and may be arbitrarily modifiable. For example, the number of the pixels P included in the pixel unit U may be three, and the display colors thereof may be three colors of red, green, and blue. In this case, the color filter 22 having the red filter region (R), the green filter region (G), and the blue filter region (B) may be used. As a matter of course, the display order of the pixels P in the pixel unit U may also be arbitrary. In this case as well, display unevenness is suppressed by the processing of equalizing lowering numbers and therefore, it is possible to obtain similar effects.

In addition, the configuration of the porous layer 33 is not limited in particular, as long as the plurality of pores 34 are provided. For example, the porous layer 33 may be a polymeric film in which the pores 34 are formed by perforation processing with a laser, a cloth woven of synthetic fibers and/or the like, an open-cell foam porous polymer, or the like. Alternatively, the porous layer 33 may be, for example, a porous film formed by the following procedure, utilizing phase separation. First, a water solution of polymer particles (for example, polymethyl methacrylate), hydrophobic-type inorganic particles (for example, titanium oxide), and other material (for example, polyvinyl alcohol) is prepared. This water solution is applied to a surface of a support base (for example, a glass substrate), and then dried to form a coating film. By immersing the coating film in a solvent in which only the polymer particles are dissolved, a porous film is obtained. It is to be noted that the coating film may be cleaned (by ultrasonic cleaning, for example) as necessary, after being immersed.

Moreover, a display format of an image displayed by the display unit is not limited to the color display using the color filter 22, and may be monochromatic display without using the color filter 22. In this case, bright and dark (black and white) display is performed for each of the pixels P and therefore, contrast is effected utilizing the difference between display colors. In this case, likewise, display unevenness is suppressed by the processing of equalizing lowering numbers and therefore, it is possible to obtain similar effects.

In addition, as described above, when a color image is displayed, the gray-scale display is performed according to the strength or the application time of the lowering voltage applied to each of the pixels P. Therefore, at the time when the processing of equalizing lowering numbers is performed, the total applied amounts of the lowering voltage in the respective pixels P may be different in some cases. This total applied amount is expressed as the total applied amount=integrated time of voltage×integrated strength of voltage. In this case, corresponding to the difference between the total applied amounts of the lowering voltage of the respective pixels P, there also occurs a difference between the amounts of the electrophoretic particles 32 moving to the adjacent pixel P unintentionally under the influence of an electric field. Therefore, merely performing the processing of equalizing lowering numbers, in which the lowering numbers of the pixels P are brought close to each other, may result in insufficient suppression of display unevenness.

Therefore, the voltage control circuit 50 may compute the total applied amount of the lowering voltage for each of the pixels P, and when the total applied amounts of the lowering voltage in the respective pixels P are different, the voltage control circuit 50 may additionally apply the lowering voltage to at least one of the pixels P, to bring the total applied amounts close to each other (equalized, for example). In a manner similar to that in the case in which the processing of equalizing lowering numbers is performed, this processing of applying the lowering voltage may also be performed at an arbitrary timing following the start of display. The particle densities are thereby further averaged and therefore, it is possible to suppress the display unevenness further.

<2. Application Examples (Electronic Apparatuses) of Display Unit>

Next, application examples of the above-described display unit will be described. However, a configuration of each of the electronic apparatuses to be described below is only an example and thus, the configuration thereof is modifiable as appropriate.

Figure 7:
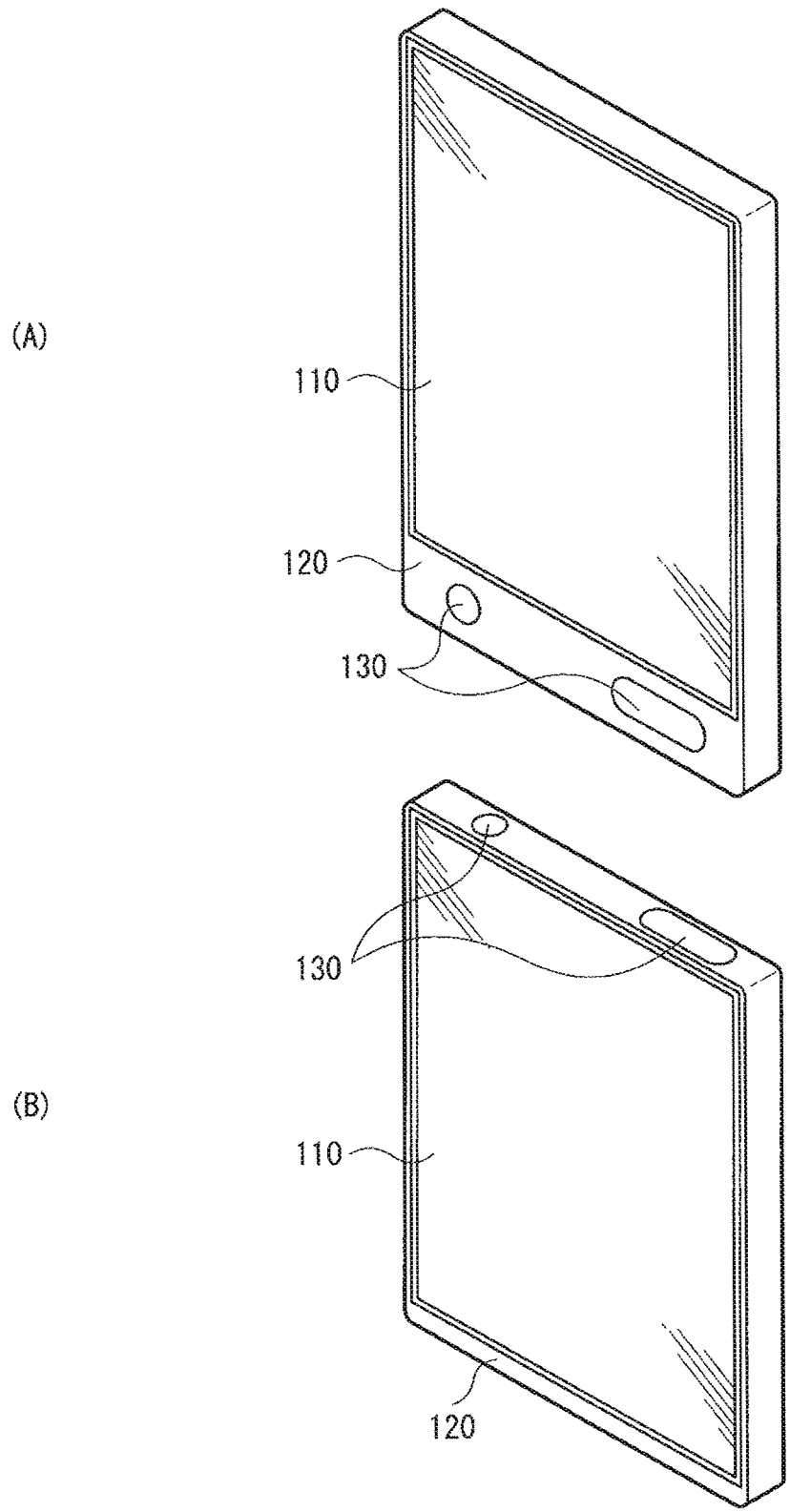
FIG. 7 is a diagram including perspective views each illustrating a configuration of an electronic book using the display unit.

FIG. 7 illustrates appearances of an electronic book. This electronic book may include, for example, a display section 110, a non-display section (a housing) 120, and an operation section 130. It is to be noted that the operation section 130 may be provided either on a front surface of the non-display section 120 as illustrated in Part (A), or on a top surface thereof as illustrated in Part (B). It is to be noted that the display unit may be mounted on a PDA having a configuration similar to that of the electronic book illustrated in FIG. 7.

Figure 8:
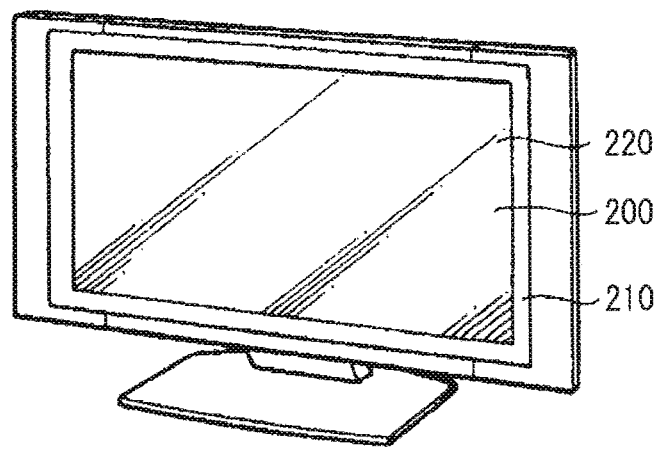
FIG. 8 is a perspective view illustrating a configuration of a television receiver using the display unit.

FIG. 8 illustrates an appearance of a television receiver. This television receiver may have, for example, an image-display screen section 200 that includes a front panel 210 and a filter glass 220.

Figure 9:
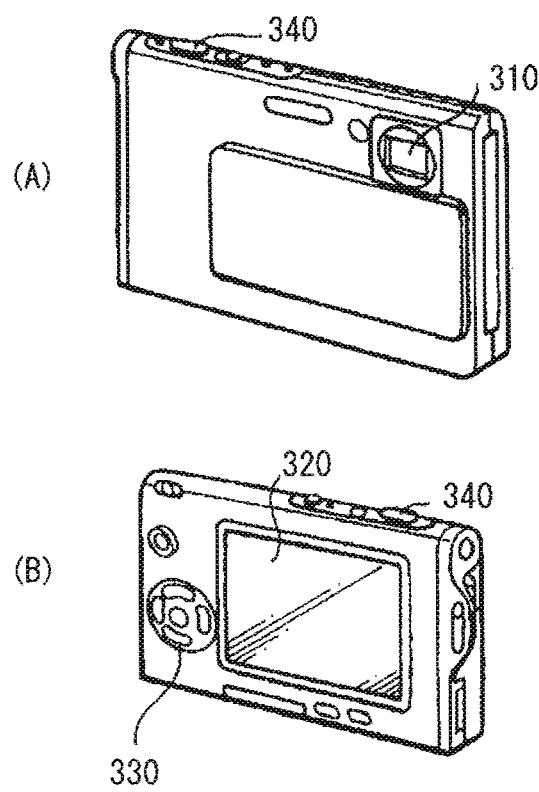
FIG. 9 is a diagram including perspective views each illustrating a configuration of a digital still camera using the display unit.

FIG. 9 illustrates appearances of a digital still camera. Parts (A) and (B) illustrate a front face and a rear face, respectively. This digital still camera may include, for example, a flash emitting section 310, a display section 320, a menu switch 330, and a shutter button 340.

Figure 10:
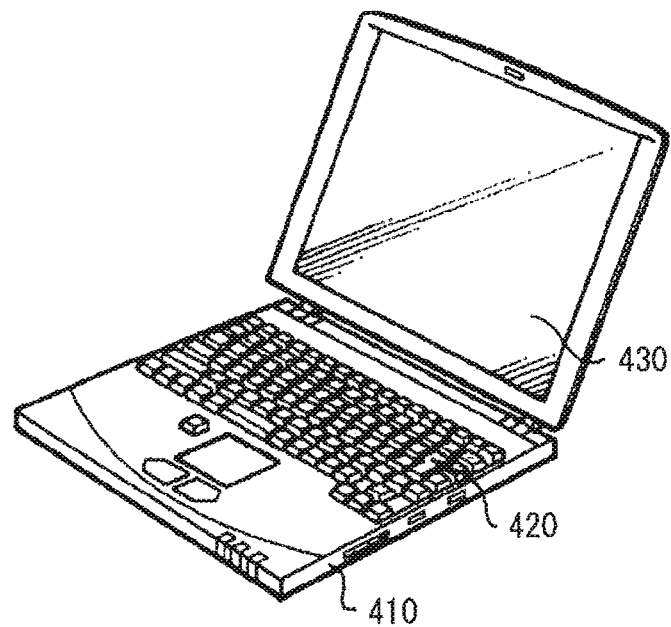
FIG. 10 is a perspective view illustrating an appearance of a personal computer using the display unit.

FIG. 10 illustrates an appearance of a laptop personal computer. This laptop personal computer may include, for example, a main body section 410, a keyboard 420 provided to enter characters and the like, and a display section 430 displaying an image.

Figure 11:
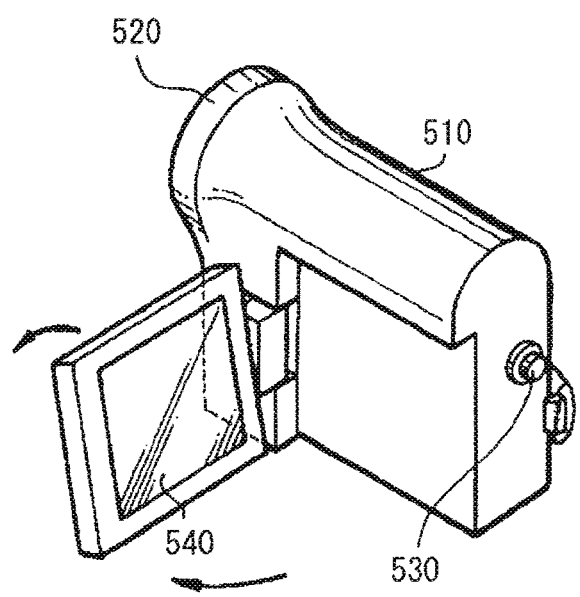
FIG. 11 is a perspective view illustrating an appearance of a video camera using the display unit.

FIG. 11 illustrates an appearance of a video camera. This video camera may include, for example, a main body section 510, a lens 520 disposed on a front face of the main body section 510 to shoot an image of a subject, a start/stop switch 530 used in shooting, and a display section 540.

Figure 12:
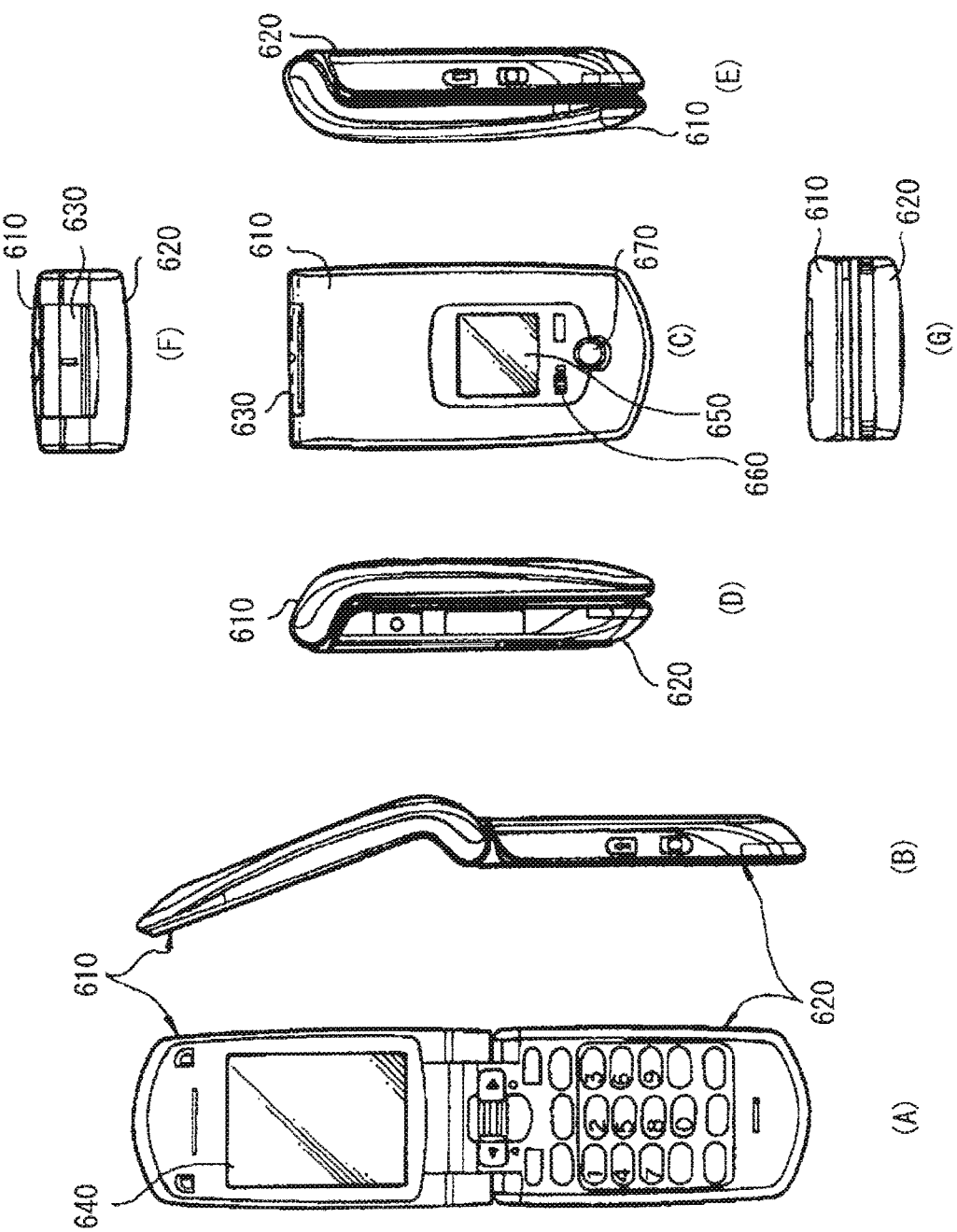
FIG. 12 is a diagram including plan views each illustrating a configuration of a mobile phone using the display unit.

FIG. 12 illustrates appearances of a mobile phone. Parts (A) and (B) illustrate a front face and a side face of the mobile phone in an open state, respectively. Parts (C) to (G) illustrate a front face, a left side face, a right side face, a top face, and an undersurface of the mobile phone in a closed state, respectively. This mobile phone may be, for example, a unit in which an upper housing 610 and a lower housing 620 are connected by a coupling section (a hinge section) 630, and include a display 640, a sub-display 650, a picture light 660, and a camera 670.

The present technology has been described above with reference to the embodiment, but is not limited thereto and may be variously modified. For example, the display unit of the present technology may be applied to an electronic apparatus other than those described above.

It is to be noted that the present technology may adopt the following configurations.

(1) A display unit including:
an electrophoretic particle disposed between a pair of electrodes for each pixel; and
a voltage control circuit applying a voltage for each pixel, to move the electrophoretic particle, wherein
the voltage control circuit counts, for each pixel, a number of applications of a first voltage and a number of applications of a second voltage, the first voltage being applied to move the electrophoretic particle towards one of the electrodes, and the second voltage being applied to move the electrophoretic particle towards the other of the electrodes, and
at an arbitrary timing following start of display, when the number of applications of the second voltage in part of pixels is smaller than those in other pixels, the voltage control circuit applies the second voltage to the pixel with the smaller number of applications, to bring this smaller number of applications closer to the number of applications in the other pixel.

(2) The display unit according to (1), wherein, at an arbitrary timing following start of display, when total applied amounts of the second voltage in the respective pixels are different, the voltage control circuit applies the second voltage to at least one of the pixels to bring the total applied amounts closer to each other.

(3) A display unit including:
a display substrate including an electrophoretic device and a color filter, the color filter having a filter region of a color different for each pixel; and
a voltage control circuit applying a voltage for each pixel, to drive the electrophoretic device, wherein
the electrophoretic device includes, in an insulating liquid, a plurality of electrophoretic particles and a porous layer, the porous layer being formed of a fibrous structure, and
a plurality of non-migrating particles having optical reflection properties different from those of the electrophoretic device are included in the fibrous structure.

(4) The display unit according to (3), wherein
the voltage control circuit counts, for each pixel, a number of applications of a first voltage and a number of applications of a second voltage, the first voltage being applied to move the electrophoretic particles towards one of electrodes, and the second voltage being applied to move the electrophoretic particles towards the other of the electrodes, and
at an arbitrary timing following start of display, when the number of applications of the second voltage in a first pixel is smaller than that in a second pixel having a filter region of a color different from that of the first pixel, the voltage control circuit applies the second voltage to the first pixel, to bring this smaller number of applications closer to the number of applications in the second pixel.

(5) A method of driving a display unit including an electrophoretic particle disposed between a pair of electrodes for each pixel, the method including:
counting, for each pixel, a number of applications of a first voltage and a number of applications of a second voltage, the first voltage being applied to move the electrophoretic particle towards one of the electrodes, and the second voltage being applied to move the electrophoretic particle towards the other of the electrodes, and
at an arbitrary timing following start of display, when the number of applications of the second voltage in part of pixels is smaller than those in other pixels, applying the second voltage to the pixel with the smaller number of applications, to bring this smaller number of applications closer to the number of applications in the other pixel.

(6) The method of driving the display unit according to (5), wherein at an arbitrary timing following start of display, when total applied amounts of the second voltage in the respective pixels are different, the second voltage is applied to at least one of the pixels to bring the total applied amounts closer to each other.

(7) An electronic apparatus including the display unit according to (1) or (2).

(8) An electronic apparatus including the display unit according to (3) or (4).

The present application is based on and claims priority from Japanese Patent Application No. 2011-225566 filed in the Japan Patent Office on Oct. 13, 2011, the entire contents of which is hereby incorporated by reference.

The invention claimed is:

1. A display unit comprising:
an electrophoretic particle disposed between a pair of electrodes for each pixel; and
a voltage control circuit applying a voltage for each pixel, to move the electrophoretic particle, wherein
the voltage control circuit counts, for each pixel, a number of applications of a first voltage and a number of applications of a second voltage, the first voltage being applied to move the electrophoretic particle towards one of the electrodes, and the second voltage being applied to move the electrophoretic particle towards the other of the electrodes, and
at an arbitrary timing following start of display, when the number of applications of the second voltage in part of pixels is smaller than that in other pixel, the voltage control circuit applies the second voltage to the pixel with the smaller number of applications, to bring this smaller number of applications closer to the number of applications in the other pixel.

2. The display unit according to claim 1, wherein, at an arbitrary timing following start of display, when total applied amounts of the second voltage in the respective pixels are different, the voltage control circuit applies the second voltage to at least one of the pixels to bring the total applied amounts closer to each other.

3. A display unit comprising:
a display substrate including an electrophoretic device and a color filter, the color filter having a filter region of a color different for each pixel; and
a voltage control circuit applying a voltage for each pixel, to drive the electrophoretic device, wherein
the electrophoretic device includes, in an insulating liquid, a plurality of electrophoretic particles and a porous layer, the porous layer being formed of a fibrous structure, and a plurality of non-migrating particles having optical reflection properties different from those of the electrophoretic device are included in the fibrous structure.

4. The display unit according to claim 3, wherein the voltage control circuit counts, for each pixel, a number of applications of a first voltage and a number of applications of a second voltage, the first voltage being applied to move the electrophoretic particles towards one of electrodes, and the second voltage being applied to move the electrophoretic particles towards the other of the electrodes, and at an arbitrary timing following start of display, when the number of applications of the second voltage in a first pixel is smaller than that in a second pixel having a filter region of a color different from that of the first pixel, the voltage control circuit applies the second voltage to the first pixel, to bring this smaller number of applications closer to the number of applications in the second pixel.

5. A method of driving a display unit including an electrophoretic particle disposed between a pair of electrodes for each pixel, the method comprising:

counting, for each pixel, a number of applications of a first voltage and a number of applications of a second voltage, the first voltage being applied to move the electrophoretic particle towards one of the electrodes, and the second voltage being applied to move the electrophoretic particle towards the other of the electrodes, and at an arbitrary timing following start of display, when the number of applications of the second voltage in part of pixels is smaller than that in other pixel, applying the second voltage to the pixel with the smaller number of applications, to bring this smaller number of applications closer to the number of applications in the other pixel.

6. The method of driving the display unit according to claim 5, wherein at an arbitrary timing following start of display, when total applied amounts of the second voltage in the respective pixels are different, the second voltage is applied to at least one of the pixels to bring the total applied amounts closer to each other.

7. An electronic apparatus comprising a display unit, the display unit including an electrophoretic particle disposed between a pair of electrodes for each pixel, and a voltage control circuit applying a voltage for each pixel, to move the electrophoretic particle, wherein the voltage control circuit counts, for each pixel, a number of applications of a first voltage and a number of applications of a second voltage, the first voltage being applied to move the electrophoretic particle towards one of the electrodes, and the second voltage being applied to move the electrophoretic particle towards the other of the electrodes, and at an arbitrary timing following start of display, when the number of applications of the second voltage in part of pixels is smaller than that in other pixel, the voltage control circuit applies the second voltage to the pixel with the smaller number of applications, to bring this smaller number of applications closer to the number of applications in the other pixel.

8. An electronic apparatus comprising a display unit, the display unit including a display substrate including an electrophoretic device and a color filter, the color filter having a filter region of a color different for each pixel, and a voltage control circuit applying a voltage for each pixel, to drive the electrophoretic device, wherein the electrophoretic device includes, in an insulating liquid, a plurality of electrophoretic particles and a porous layer, the porous layer being formed of a fibrous structure, and a plurality of non-migrating particles having optical reflection properties different from those of the electrophoretic device are included in the fibrous structure.

* * * * *